United States Patent [19]
Yanagi

[11] Patent Number: 5,086,419
[45] Date of Patent: Feb. 4, 1992

[54] OPTICAL DISK APPARATUS FOR CONTROLLING SECOND OPTICAL BEAM BASED ON BIAS INFORMATION

[75] Inventor: Shigenori Yanagi, Kawasaki, Japan

[73] Assignee: Fujitsu Limited, Kawasaki, Japan

[21] Appl. No.: 575,847

[22] Filed: Aug. 31, 1990

[30] Foreign Application Priority Data

Aug. 31, 1989 [JP] Japan .................... 1-222936

[51] Int. Cl.⁵ .............................................. G11B 7/00
[52] U.S. Cl. .................... 369/32; 364/44.11; 364/44.32; 364/44.28
[58] Field of Search ............. 369/110, 112, 44.37, 369/44.27, 44.38, 44.11, 44.12, 44.14, 44.13, 44.28, 32, 44.31, 49.32, 44.33, 44.34; 358/342; 250/201.5; 360/77.04

[56] References Cited

U.S. PATENT DOCUMENTS

| | | |
|---|---|---|
| 4,841,502 | 6/1989 | Murakami et al. ............. 369/111 |
| 4,873,679 | 10/1989 | Murai et al. ................... 369/32 |

FOREIGN PATENT DOCUMENTS

| | | | |
|---|---|---|---|
| 62-78744 | 4/1987 | Japan | 369/44.27 |
| 1-82340 | 3/1989 | Japan | 369/44.32 |

*Primary Examiner*—Roy N. Envall, Jr.
*Assistant Examiner*—Thai Tran
*Attorney, Agent, or Firm*—Staas & Halsey

[57] ABSTRACT

When a light beam of a reference optical head correctly tracks on the center of a proper track, deviation, due to an optical head assembling error or an optical disk eccentrically, of a light beam of a non-reference optical head from the center of said proper track is memorized in advance as bias information. At a time of a seek control or a track lump control, the non-reference optical head is controlled to move along a track with said bias information, so that not only the reference optical head but also the non-reference optical head correctly track on the proper aimed track, when a seek control or a track jump control is performed. This invention enables both the light beam of the reference optical head and the light beam of the non-reference optical head to correctly track on a proper track without being affected by neither any optical head assembling error nor any optical disk eccentricity.

14 Claims, 4 Drawing Sheets

OPTICAL DISK APPARATUS FOR CONTROLLING SECOND OPTICAL BEAM BASED ON BIAS INFORMATION

BACKGROUND OF THE INVENTION

1. Field of the Invention

This invention enables an existing optical disk apparatus to erase and write information on an optical disk in a single rotation with two optical heads loaded on one positioner.

2. Related Art

Recently, an optical disk apparatus, like a magnetic disk device, that can rewrite new information after erasing old information has appeared.

Such optical disk apparatuses that can erase/write (overwrite) are classified as either an external magnetic field type or a non-external magnetic field type. The non-external magnetic field type does not need an erasing action by an erase beam and can immediately write new information by overwriting the new information with a write beam. On the other hand, the external magnetic field type needs to write new information with a write beam only after erasing old information with an erase beam.

If such an external magnetic field type optical disk apparatus erases and writes information with a single optical head, a writing action lags behind a reading action, since two rotations of an optical disk are necessary for writing information on a single track.

To solve this problem, an optical disk apparatus with two optical heads, i.e. an optical head for erasing and another for writing, combined into a single optical head system has been developed, so that one track's information can be erased and written in a single rotation of an optical disk.

FIG. 1 is a block diagram of the basic configuration of such an existing optical disk apparatus that can erase and write information.

In FIG. 1, an optical disk 30 is composed of more than one track 31, and information is written into each track 31.

A first optical head 10 is equipped with a first optical system 11 and a first lens actuator 12 inside thereof and read and writes information from and in the optical disk 30.

The first optical system 11 is equipped with a first objective lens 111 and projects a first light beam 112 on the optical disk 30 and generates each light receipt signal for making a first track error signal WTES that indicates a radial difference of the illuminated position of first light beam 112 from the center of the track 31 due to a track oscillation caused by various factors and a first focus error signal WFES that indicates a focus error of the first light beam 112 due to a plane vibration of the optical disk 30.

The first lens actuator 12 performs a focusing control by moving the first objective lens 111 vertically in FIG. 1 according to a first focus drive signal WFDV that is applied from outside and, performs a tracking control by moving the first objective lens 111 horizontally (along the track 31) in FIG. 1 according to a first lens drive signal WLDV that is also applied from outside, thereby causing the first objective lens 111 to follow the track.

The first lens actuator 12 is also equipped with a position sensor inside thereof (not shown in FIG. 1) and generates a light receipt signal for making a first position signal WTPS that indicates the position of the first optical head 10.

A second optical head 20 is equipped with a second optical system 21 and a second lens actuator 22 inside and erases written information in the optical disk 30.

The second optical system 21 is equipped with a second objective lens 211 and projects a second light beam 212 on the optical disk 30 and generates each light receipt signal for making a second track error signal ETES that indicates a radial difference of the illuminated position of second light beam 212 from the center of the track 31 due to a track oscillation caused by various factors and a second focus error signal EFES that indicates a focus error of the second light beam 212 due to a plane vibration of the optical disk 30.

The second lens actuator 22 performs a focusing control by moving the second objective lens 211 vertically in FIG. 1 according to a second focus drive signal EFDV that is applied from outside and performs a tracking control by moving the second objective lens 211 horizontally (along the track 31) in FIG. 1 according to a second lens drive signal ELDV that is also applied from outside.

The second lens actuator 22 is also equipped with a position sensor inside thereof (not shown in FIG. 1) and generates a light receipt signal for making a second position signal ETPS that indicates the position of the optical head 20.

A positioner 40 is equipped with a voice coil motor (abbreviated as VCM) 41, the first optical head 10 and the second optical head 20, and controls the moving of both the optical heads 10 and 20 according to a VCM driving signal VCDV that is applied from outside to the VCM 41.

As shown in FIG. 2A, the first optical head 10 and the second optical head 20 are loaded on the positioner 40 in a configuration such that, when the first light beam 112 of the first optical head 10 illuminates a position on the track 31, the second light beam 21 2 of the second optical head 20 illuminates other position on the same track 31.

A first track servo control part 50 makes the first track error signal WTES and the first track position signal WTPS by a light receipt signal from the first optical system 11 and the first lens actuator 12 and generates, from these WTES and WTPS signals, the first lens driving signal WLDV that controls the moving of the first objective lens 111 to be supplied to the first lens actuator 12. The first track servo control part 50 also generates, from the WTES and WTPS signals, the VCM driving signal VCDV that controls the position of the positioner 40 to be supplied to the VCM 41.

A second track servo control part 60 makes the second track error signal ETES and the second track position signal ETPS by a light receipt signal from the second optical system 21 and the second lens actuator 22 and generates, from these ETES and ETPS signals, the second lens driving signal ELDV that controls the moving of the second objective lens 211 to be supplied to the second lens actuator 22.

A first focus servo control part 80 generates the first focus driving signal WFDV that performs a focus control of the first objective lens 111 by a light receipt signal from the first optical system 11 and supplies WFDV to the first lens actuator 12.

A second focus servo control part 90 generates the second focus driving signal EFDV that performs a focus control of the second objective lens 211 by a light receipt signal from the second optical system 21 and supplies EFDV to the second lens actuator 22.

The above configuration performs a track servo control based on the first optical head 10.

Namely, the first track servo control part 50 makes the first track error signal WTES and the first track position signal WTPS by a light receipt signal from the first optical system 11 and the first lens actuator 12 and generates, from these WTES and WTPS signals, the first lens driving signal WLDV that controls the moving of the first objective lens 111 to be supplied to the first lens actuator 12. The first track servo control part 50 also generates, from the WTES and WTPS signals, the VCM driving signal VCDV that controls the position of the positioner 40 to be supplied to the VCM 41. Thus, the first optical head 10 is controlled, so that the first light beam 112 projected from the first objective lens 111 tracks correctly on the proper track 31 of the optical disk 30.

The first focus servo control part 80 generates the first focus error signal WFES that performs a focus control of the first objective lens 111 by a light receipt signal from the first optical system 11 and supplies WFES to the first lens actuator 12. Thus, the first light beam 112 projected from the first optical head 10 is controlled to focus correctly on the proper track 31 of the optical disk 30.

Meanwhile, as shown in FIG. 2A, the first optical head 10 and the second optical head 20 are loaded on the positioner 40 in such a configuration that, when the first light beam 112 of the first optical head 10 illuminates a position on the track 31, the second light beam 212 of the second optical head 20 illuminates another position on the same track 31. Therefore, in an ideal case where there exists neither any optical head assembling error nor any optical disk eccentricity, when the first optical head 10 is controlled to track correctly on the proper track 31 of the optical disk 30, the second optical head 20 that is to sequentially track on the proper track 31 is controlled to automatically track correctly on the same proper track 31.

When the proper track 31 is tracked on, the second track servo control part 60 performs a track servo control such that the second light beam 212 projected from the second optical head 20 correctly follows the proper track 31 of the optical disk 30.

The second focus servo control part 90 generates the second focus error signal EFES that performs a focus control of the second objective lens 211 by a light receipt signal from the second optical system 21 and supplies EFES to the second lens actuator 22. Thus, the second light beam 212 projected from the second optical head 20 is focus-servo-controlled to focus correctly on the proper track 31 of the optical disk 30.

An existing optical disk apparatus that erases and writes information with two optical heads controls the position of the positioner based on one optical head (a first optical head).

When there exists neither an optical head assembling error nor an optical disk eccentricity, if the reference optical head (the first optical head) is controlled to track correctly on the proper track, the other optical head (the second optical head) can be controlled to track correctly on the same proper track.

However, an actual optical disk apparatus cannot be free from an optical head assembling error. Besides, an optical disk that has a substrate made from plastic materials like PC (Poly Carbonate) and PMMA (Poly Metyl Methacrylate) cannot avoid being warped or externally wavy because of a thermal strain at the time of molding, such as thermal pressurized molding or thermal injection molding. As a result, the surface of the optical disk is inevitably undulated and the track deviates from true roundness. Also, depending on the processing tolerance at the time the center of the optical disk is bored, the center has some eccentricity.

When an optical disk is loaded on a turntable of an optical disk driver, the weight of the optical disk causes a deflection. Thus, an optical disk cannot be free from a built-in vibration of the surface and track, and the optical disk driver also causes such a vibration, because the optical disk driver has a gradient in its turntable and precession.

Therefore, even if the first light beam 112 projected from the first optical head 10 correctly tracks on and follows the proper track 31, the second light beam 212 projected from the second optical head 20 does not track on said proper track 31 and instead follows locations being biased from the center of said track 31, as shown in FIG. 2B. This amount of bias is made generally by superimposing a direct current like bias, such as an assembling error for each optical head, and an alternate current like bias, such as the optical disk eccentricity, and can reach a width as wide as 10 tracks, when the track pitch is 1.6 micro meters, for example.

Consequently, the existing method has a disadvantage in that, when one optical head on which the other one is based correctly tracks on the proper track, the other optical head has only an about 10% chance of tracking on the proper track. Especially when a track jump control or a seek control is made, since the track jump control or the seek control is made based on one optical head, even if the optical head on which the other is based correctly tracks on a proper track, the other optical head has a problem in that it fails to track on the same proper track due to the bias and being prone to track on some other track.

SUMMARY OF THE INVENTION

This invention is made with the above background in mind and is aimed at enabling a light beam of the other optical head to correctly track on a proper track without being affected by any assembling error of the optical heads or the optical disk eccentricity, even when one of the optical heads on which the other optical head is based performs a seek control or a track jump control.

Namely, this invention provides an optical disk apparatus comprising a first optical head having a first lens actuator that controls the location of a first light beam projected on a track of an optical disk, a second optical head having a second lens actuator that controls the location of a second light beam projected on a different location from the location projected by said first light beam on the optical disk, a first track servo control part that performs a control so that the first light beam illuminates on the proper track, a second track servo control part that performs a control so that the second light beam illuminates on the proper track; and a positioner loaded with the first optical head and the second optical head that controls the position of said two optical heads by a control signal generated by the first track servo part.

A bias information memory memorizes the relative location of the second optical head with regard to the first optical head as the bias information, when the first track servo control part and the second track servo control part make the light beam of the first optical head and the light beam of the second optical head track on the proper track of an optical disk. This bias information corresponds to the respective rotation positions of a cycle of at least one discreational track.

When the positioner is moved for projecting the first light beam on the proper track, the second track servo control part controls the location of the second light beam through second actuator, according to the bias information stored in the bias information memory.

In the above configuration, when the optical disk apparatus is initially set or when the optical disk is replaced, the bias information memory part stores the information about the relative location of the second optical head with regard to the first optical head as the bias information, when the light beam of the first optical head and the light beam of the second optical head correctly track on the proper track of an optical disc.

Next, the first track servo control part controls the positioner and the first lens actuator and performs a seek control and a track jump control, and the first light beam of the first optical head is made to track on the proper track.

Meanwhile, the second track servo control part controls the second actuator of the second optical head by a control signal adjusted by the bias information stored in said bias information memory.

Thus, the bias of the second light beam of the second optical head due to any assembling error of each optical head or the optical disk eccentricity is adjusted, and the second light beam is caused to be controlled to track on the same track tracked on by the first light beam of the first optical head.

The explanation above concerns the case of making a track servo control based on the first optical head. Yet alternatively, a track servo control based on the second optical head can be made, in which case a positioner is track-servo-controlled by a second track servo control part. Also, the bias information of the first optical head relative to the second optical head is stored in a bias information memory.

As explained so far, since the bias of a non-reference optical head (a second optical head) relative to a reference optical head( a first optical head) on an optical disk due to an optical head assembling error and the optical disk eccentricity is memorized as bias information and a control signal adjusted by this bias information performs a track location control of the non-reference optical head during a seek control and a track jump control, the non-reference optical head can correctly track on the proper track, too, when a seek control or a track jump control is performed. Therefore, a precise seek control or track jump control of the non-reference optical head can be made without being affected by any optical head assembling error or the optical disk eccentricity

BRIEF DESCRIPTION OF THE DRAWINGS

FIG. 2A and FIG. 2B explain the bias amount of the second optical head from the track center, when the first optical head is tracked on.

DESCRIPTION OF THE PREFERRED EMBODIMENTS

Figure 3:
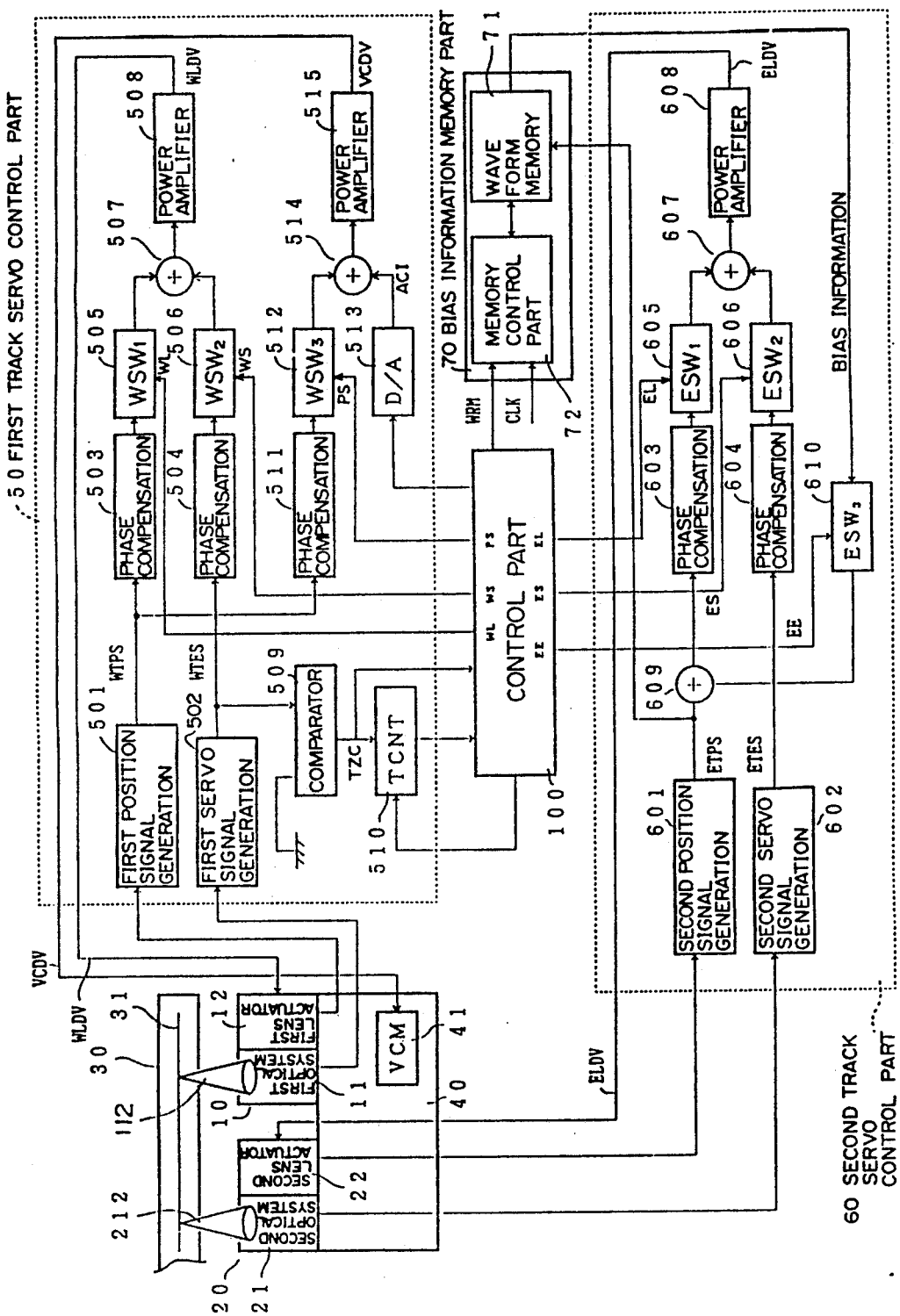
FIG. 3 is a block chart that shows the configuration of a preferred embodiment of this invention.

A preferred embodiment of this invention will be explained below by referring to FIG. 3 and FIG. 4. FIG. 3 is a block chart that shows the configuration of a preferred embodiment of this invention.

In FIG. 3, an optical disk 30 is composed of more than one track 31, and information are written into each track 31.

A first optical head 10 is equipped with a first optical system 11 and a first lens actuator 12 inside thereof and reads and writes information from and in the optical disk 30. The first optical system 11 is configured to concentrate a laser beam spot on the surface of optical disk 30 and to detect such a thing as the relative bias of said laser beam spot from the aimed position on optical disk 30. The first lens actuator 12 is configured to maintain the location of the laser beam spot relative to the aimed position on optical disk 30 constant by performing a focusing control to have a first objective lens 111 of a first lens optical system, described later, follow a plane vibration of the optical disk 30 and by making a tracking control to have the same follow a track vibration of the optical disk 30.

Although some components are not specifically shown in FIG. 3, the first optical system 11 is composed of a semiconductor laser that becomes the light source, a collimator lens that converts a linearly polarized light beam emitted by the semiconductor laser into a parallel ray, a light isolator including a quarter wavelength board and a beam splitter, and for converting the parallel ray into a circularly polarized light, the first objective lens 111 that focuses the circularly polarized light passing through the light isolator into beam spot (spot light)of the first light beam 112 and projects it on the optical disk 30, and a light receiving device that, by concentrating the light reflected from the optical disk 30 which is already converted to a linearly polarized light passing through the light isolator, generates each receipt signal for making a first track error signal WTES that indicates a radial difference of the first light beam 112 from the center of the track 31 due to a track oscillation caused by various factors and a first focus error signal WFES that indicates a focus error of the first light beam 112 due to a plane vibration of the optical disk 30. This light receiving device is composed, for example, of a well-known four or two division light receiving device.

The first lens actuator 12 is equipped with a focus actuator (focus coil) that performs a focusing control by moving the first objective lens 111 vertically in FIG. 3 according to a first focus drive signal WFDV (not shown in FIG. 3) that is applied from outside and a track actuator that performs a tracking control by moving the first objective lens 111 horizontally (along the track 31) in FIG. 3 according to a first lens drive signal WLDV that is also applied from outside.

Furthermore, a first lens actuator 12 is equipped with a first position sensor inside thereof (not shown in FIG. 3) and generates a light receipt signal for making a first position signal WTPS that indicates the position of the optical head 10. The first position sensor detects a sense signal corresponding to the bias amount in a radial direction, the bias amount being determined based a track lead-in starting position.

The first position sensor is composed of a light emitting part and a light receiving part that are set on the opposite side of a fixed slit positioned at an end part of said first lens actuator 12. The fixed slit has a window through which the light emitted from the light emitting part is received by the light receiving part. This light receiving device is composed, for example, of a well-known four or two division light receiving device. Distribution of the received light of each four or two division light receiving device within the light receiving device is caused to change according to the deviation of the first lens actuator along the track and along the direction parallel to the rotation axis of the optical disk 30, and the first track error signal WTES and first focus error signal WFES are generated, according to the distribution of the received light A second optical head 20 is equipped with a second optical system 21 that is configured similarly to said first optical system 11 and a second lens actuator 22 configured similarly to said first lens actuator 12 inside thereof and erases written information in the optical disk 30.

The second optical system 21 is equipped with a second objective lens 211 and projects a second light beam 212 on the optical disk 30 and generates each light receipt signal for making a second track error signal ETES that indicates a radial difference of the second light beam 212 from the center of the track 31 and a second focus error(signal EFES (not shown in FIG. 3) that indicates a focus error of the second light beam 212.

The second lens actuator 22 performs a focusing control by moving the second objective lens 211 vertically in FIG. 3 according to a second focus drive signal EFDV (not shown in FIG. 3) that is applied from outside and performs a tracking control by moving the second objective lens 211 horizontally (radially on the optical disk 30) in FIG. 3 according to a second lens drive signal ELDV that is also applied from outside.

Furthermore, the second lens actuator 22 is also equipped with a second position sensor inside thereof (not shown in FIG. 3) and generates a light receipt signal for making a second position signal ETPS that indicates the position of the second optical head 20.

A positioner 40 is equipped with a voice coil motor (abbreviated as VCM) 41 that comprises of a permanent magnet and a magnetic substance (yoke), the first optical head 10 and the second optical head 20, and VCM 41 controls the moving of said two optical heads 10 and 20 according to a VCM driving signal VCDV that is applied from outside.

The second optical system 21, the second lens actuator 22 and the second position sensor are configured similarly to the first optical system 11, the first lens actuator 12 and the first position sensor, respectively.

Figure 1:
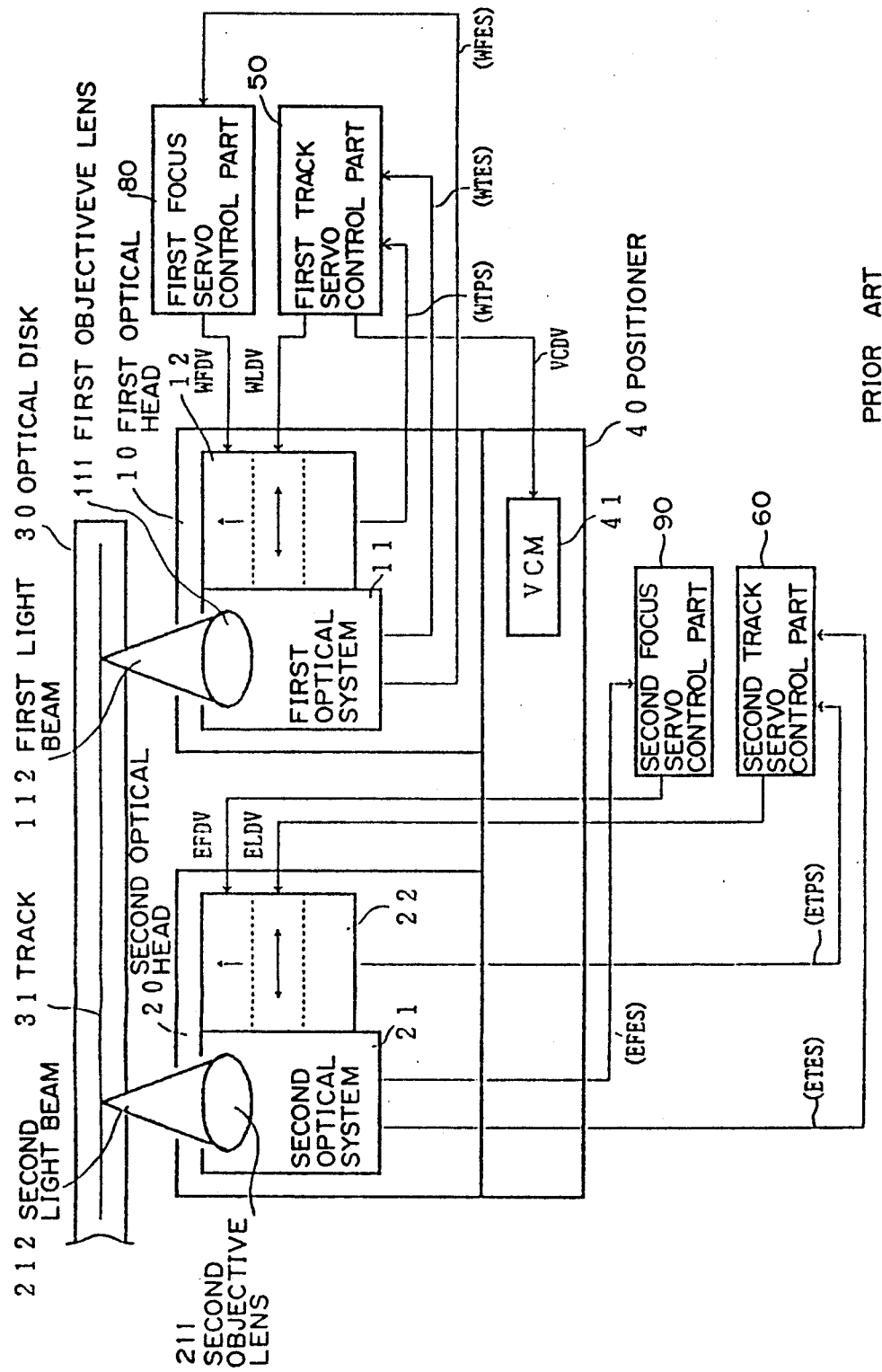
FIG. 1 is a block diagram of the basic composition of an existing optical disk apparatus that can erase and write information.
Figure 2A:
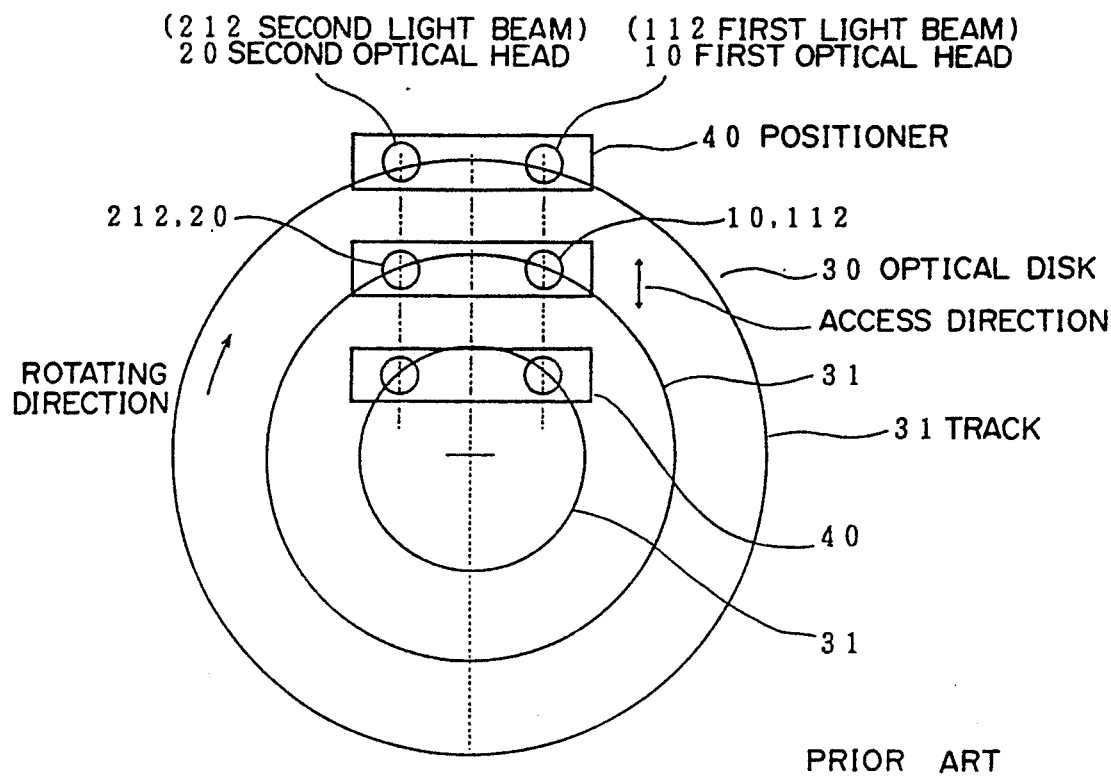
Figure 2B:
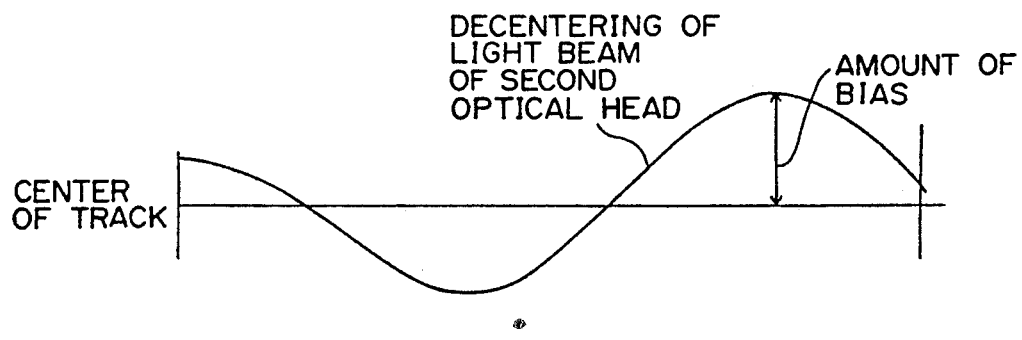

As shown in FIG. 2A, the first optical head 10 and the second optical head 20 are loaded on the positioner 40 in such a configuration that, when the first light beam 112 of the first optical head 10 illuminates a position on the track 31, the second light beam 212 of the second optical head 20 illuminates another position on the same track 31.

A first track servo control part 50 makes the first track error signal WTES and the first track position signal WTPS by a light receipt signal from the first optical system 11 and the first lens actuator 12 and generates, from these WTES and WTPS signals, the first lens driving signal WLDV that controls the moving of the first objective lens 111 to be supplied to the first lens actuator 12. The first track servo control part 50 also generates, from the WTES and WTPS signals, the VCM driving signal VCDV that controls the position of the positioner 40 to be supplied to VCM 41.

A second track servo control part 60 makes the second track error signal ETES and the second track position signal ETPS by a light receipt signal from the second optical system 21 and the second lens actuator 22 and generates, from these ETES and ETPS signals, the second lens driving signal ELDV that controls the moving of the second objective lens 211 to be supplied to the second lens actuator 22.

A bias information memory 70 memorizes the relative location of the second optical head 20 with regard to the first optical head 10 as the bias information, when the first track servo control part 50 and the second track servo control part 60 make the light beam of the first optical head 10 and the light beam 112 of the second optical head track on the proper track 31 of an optical disk 30. This bias information corresponds to the respective rotation positions of a cycle of at least one discreational track.

When the positioner is moved for projecting the first light beam on the proper track, the second track servo control part 60 controls the location of the second light beam 212 through second actuator, according to the bias information stored in the bias information memory 70.

A control part 100 sends various control signals, that will be described later, to the first track servo control part 50, the second track servo control part 60 and the bias information memory part 70, and controls each part as well as the optical disk apparatus as a whole.

Next, each block of the first track servo control part 50 will be described in detail.

A first track position signal generating circuit 501 generates the first track position signal WTPS that indicates the position of the optical head 10, based on the light receipt signal sent from the first lens actuator 12.

When the first light beam 112 is off from the center of the track 31 due to such a cause as optical disk eccentricity 30, this first track position signal WTPS indicates the bias information.

A first servo signal generating circuit 502 generates the first track error signal WTES that indicates the tracking error of the first light beam 112 against the center of the predetermined track 31, based on the light receipt signal sent from the first optical system 11.

A phase compensation circuit 503 performs a phase compensation in a high frequency range of the first track position signal WTPS and stabilizes its servo loop. Another phase compensation circuit 504 performs a phase compensation at a high range of the first track error signal WTES and stabilizes its servo loop.

A write servo switch 505 (shown as $WSW_1$) is controlled to turn on and off by a servo switching signal WL from the control part 100. Also, a write servo switch 506 (shown as $WSW_2$) is controlled to turn on and off by a servo switching signal WS from the control part 100.

An adder 507 adds the first track position signal WTPS that phase compensation circuit 503 outputs and 1 that is input via $WSW_1$ to the first track error signal WTES that the phase compensation circuit 504 outputs and that is input via $WSW_2$.

A power amplifier 508 generates a first lens driving signal WLDV by power amplification of the first track position signal WTPS or the first track error signal WTES that are input from the adder 507, (although a temporary moment exists when both WTPS and WTES are applied simultaneously at the switching time of $WSW_1$ and $WSW_2$,) and supplies the first lens driving signal WLDV to the first lens actuator 12.

A comparator 509 compares the first track error signal WTES applied from the first servo signal generating circuit 502 and the zero voltage point, generates a zero cross signal TZC that indicates the zero cross point of the first track error signal WTES, and sends the zero cross signal TZC to a track counter (indicated as TCNT) 510 and the control part 100.

A track counter 510 counts the number of zero cross signals TZC that the comparator 509 generates and outputs the count value to the control part 100.

A write servo switch 512 (shown as $WSW_3$) is controlled to turn on and off by a servo switching signal PS from the control part 100.

A phase compensation circuit 511 performs a phase compensation in a high frequency range of the first track position signal WTPS through a process such as differentiating WTPS and stabilizes its servo loop.

A D/A converter 513 converts the accelerating current signal ACI applied from the control part 100.

An adder 514 adds the first track position signal WTPS that the phase compensation circuit 511 outputs and that is input via $WSW_3$ to the accelerating current signal ACI that the D/A converter 513 outputs.

A power amplifier 515 generates a VCM driving signal VCDV which drives the VCM 41 by power amplification of the first track position signal WTPS that is output from the adder 514 or the accelerating current signal ACI that is output from the D/A converter 513 (although there is a moment when both the first track position signal WTPS and the accelerating current signal ACI are applied simultaneously at the switching time of $WSW_3$) and supplies the VCM driving signal VCDV to the VCM 41 of the positioner 40.

Next, each block of the second track servo control part 60 is elaborated.

A second track position signal generating circuit 601 generates the second track position signal ETPS that indicates the position of the optical head 20, based on the light receipt signal sent from said position sensor of the second lens actuator 22.

When the second light beam 512 is off from the center of the track 31, for example, because of optical disk eccentricity 30, this second track position signal ETPS indicates the bias information which is stored in the bias information memory part 70.

A second servo signal generating circuit 602 generates the second trafficking error signal ETES that indicates the traffic error of the second light beam 212 against the center of the predetermined track 31, based on the light receipt signal sent from the second optical system 21.

A phase compensation circuit 603 performs a phase compensation in a high frequency range of the second track position signal ETPS and stabilizes its servo loop. Another phase compensation circuit 604 performs a phase compensation at a high range of the second track error signal ETES and stabilizes its servo loop.

An erase servo switch 605 (shown as $ESW_1$) is controlled to turn on and off by a servo switching signal EL from the control part 100. Also, an erase servo switch 606 (shown as $ESW_2$) is controlled to turn on and off by a servo switching signal ES from the control part 100.

An adder 607 adds the second track position signal ETPS that the phase compensation circuit 603 outputs and that is input via $ESW_1$ to the second traffic error signal ETES that the phase compensation circuit 604 outputs and that is input via $ESW_2$.

A power amplifier 608 generates a second lens driving signal ELDV by power amplification of the second track position signal ETPS or the second track error signal ETES that are input from the adder 606 (although there is a moment when both ETPS and ETES are applied simultaneously at the switching time of $ESW_1$ and $ESW_2$) and supplies the second lens driving signal ELDV to the second lens actuator 22.

An adder 609 adds the second track position signal ETPS that the second position signal generating circuit 601 outputs to the bias information read from the bias information memory part 70, and supplies the added output to $ESW_1$ 603.

An erase servo switch 610 (shown as $ESW_3$) is controlled to turn on and off by a servo switching signal EE from the control part 100, and supplies the bias information read from bias information memory 70 to adder 609.

Next, bias information memory part 70 is comprised of wave form memory 71 and memory control part 72. Wave form memory part 71 stores information about the bias of second lens actuator 22 of second optical head 20 against first lens actuator 12 of first optical head 10. This bias information is equal to second track position signal ETES, when first light beam 112 projected by first optical head 10 correctly tracks on the proper track 31 and second light beam 212 projected by second optical head 20 correctly tracks on the same said proper track 31.

Memory control part 72 performs a control of storing bias information in said wave form memory 71 by assigning an address and so forth and a control of reading the stored bias information.

The bias information is recorded by a method such as delta modulation method for minimizing the required memory capacity.

CLK is a clock synchronized to the rotation of a spindle motor (shown as SP motor, not shown) that drives optical disk 30. This clock CLK controls the timing when memory control part 72 generates a read/write signal and an address signal for wave form memory 71.

Control part 100, by write mode signal WRM supplied to memory control part 72, performs a read/write control of the bias information stored in wave form memory 71. When write mode signal WRM is on, the bias information is written into wave form memory 71. When write mode signal WRM is off, the bias information is read from wave form memory 71.

Reading and writing of the bias information can be done in various well-known ways. One of the best examples of the method of writing the bias information into an optical disk apparatus is described in Japanese patent disclosure(Kokai) 1989-189036.

Figure 4:
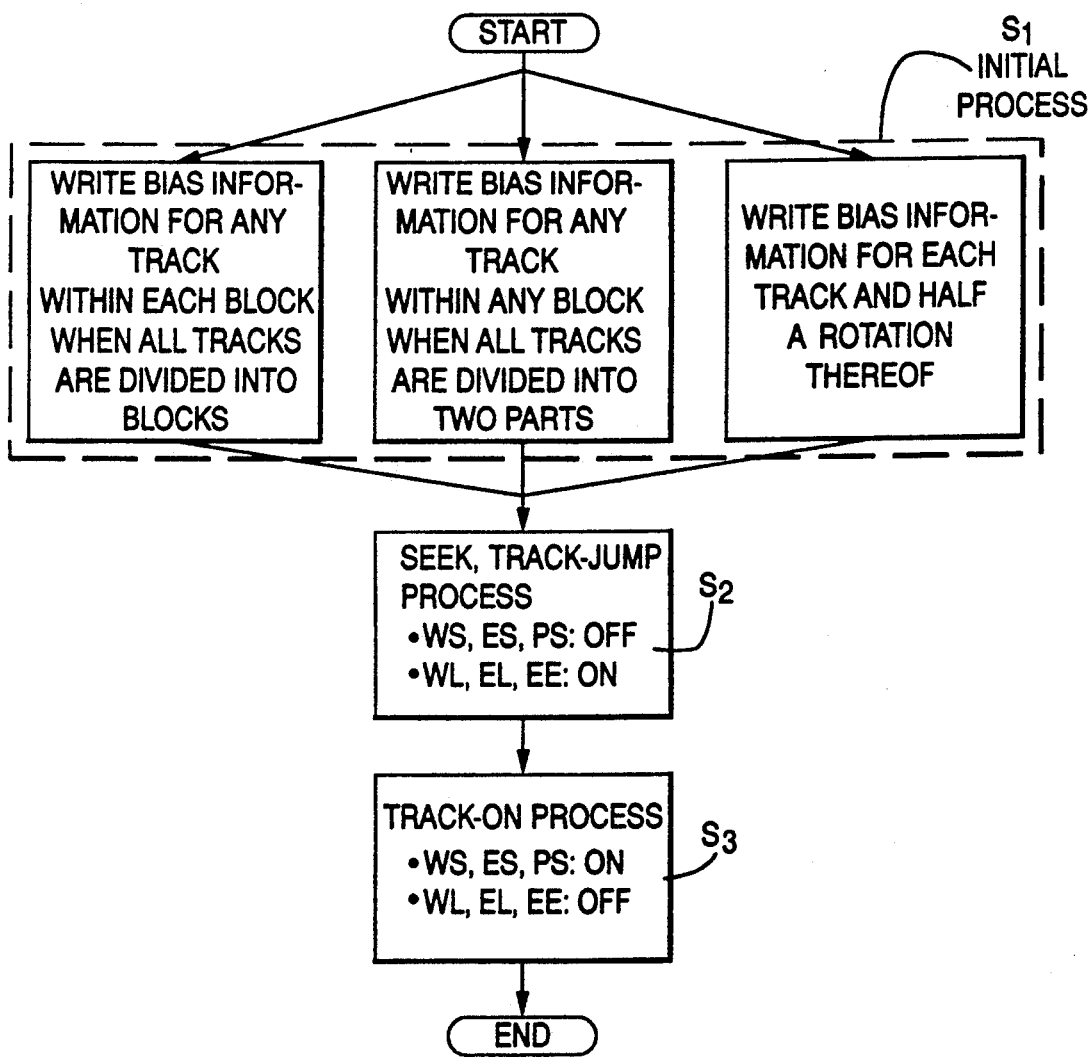
FIG. 4 is a flow chart that shows the action performed by the embodiment.

Next, actions of the embodiment configured as above are explained step by step by referring to the action flow diagram of FIG. 4.

(1) Step $S_1$

After the power of the system including the optical disk apparatus is turned on or the optical disk 30 is exchanged, an initialization process is executed and the bias information is written to the wave form memory 71 of the bias information memory 70.

At this initialization time, control part 100 turns off WSW$_1$ 505 by turning off servo switching signal WL, turns on WSW$_2$ 506 by turning on servo switching signal WS and turns on WSW$_3$ 512 by turning on servo switching signal PS for the first track servo control part 50.

Meanwhile, for the second track servo control part 60, the control part 100 turns off ESW$_1$ 605 by turning off servo switching signal EL, turns off ESW$_2$ 606 by turning on servo switching signal ES and turns on ESW$_3$ 610 by turning off servo switching signal EE. In this condition, the beam of the first optical head 10 and the beam of the second optical head 20 are positioned to the same track by a controller not shown.

By this operation, in the first track servo control part 50, a track servo control is made with double servo loops of a servo loop according to first track error signal WTES comprising the first optical system 11, the first servo signal generating circuit 502, phase compensation circuit 503, WSW$_2$ 506, the adder 507, the power amplifier 508, the first lens actuator 12 and a servo loop according to the first track position signal WTPS comprising the first lens actuator 12, the first position signal generating circuit 501, the phase compensation circuit 511, WSW$_3$ 512, the adder 514, the power amplifier 515, and the positioner 40 (VCM 41), which has the first light beam 112 projected by the first optical head 10 controlled to correctly track on the center of the proper track 31.

Meanwhile, in the second track servo control part 60, a track servo control is made with a servo loop comprising the second optical system 21, the second servo signal generating circuit 602, the phase compensation circuit 604, ESW$_2$ 606, the adder 607, the power amplifier 608, and the second lens actuator 22 according to the second track error signal ETES. In this case, since both ESW$_1$ 605 and ESW$_3$ 610 are off, the bias information stored in the bias information memory part 70 does not interfere with this track servo control.

Consequently, the second light beam 212 projected by the second optical head 20 tracks on one track 31. But there is no guarantee that this track 31 is the same as the track the first optical head 10 tracks on. Namely, when an assembling error of each optical head and eccentricity optical disk 30 exists, the second light beam 212 projected by second optical head 20 does not track on any track other than track 31, which is tracked on by first optical head 310.

A controller (not shown) reads ID information by a read signal sent from an upper rank device (also not shown) and performs such a control by issuing a seek control order that the first light beam 112 and the second light beam 212 track on the same track 31.

In this case, since second track position signal ETPS generated by the second position signal generating circuit 601 shows the position of the second lens actuator 22 on the second optical head 20, it also indicates the bias information of the second optical head 20 to first optical head 10.

Accordingly, the control part 100, having the wave form memory 71 of the bias information memory part 70 to store one track worth of said bias information keeps write mode signal WRM for one rotation of optical disk 30, i.e. a period from an arrival of a home position signal that indicates the starting point of said track 31 to the next arrival of a home position signal of the track 31, and applies it to memory control part 72.

The memory control part 72 generates an address signal of the wave form memory 71 according to clock CLK that is synchronized to the rotation of the optical disk 30 while write mode signal WRM is on and writes the bias information input from the second position signal generating circuit 601 to an address indicated by said address signal in the wave form memory 71. By this procedure, the bias information in one rotation of the optical disk 30, i.e. one track of bias information, is written into the wave form memory 71.

When one track worth of bias information is written into the wave form memory 71 as described above, the control part 100 turns off WRM.

If the bias information is written into all of the track 31 as described above, extremely precise bias information can be stored in the wave form memory 71. But for practical purposes, it is sufficient to divide all of the track 31 into multiple blocks (for example, an outer track side located on the periphery of the optical disk 30 and an inner track side located at the center side of optical disk 30) and share of the bias information of each track 31 within a block, find the bias information of any track 31 within each block, and share it as the bias information of each track 31 within the same block. This enables the bias information to be written efficiently in a short time, and also realizes a reduction in memory capacity of the wave form memory 71.

(2) Step S$_2$

When an actual erasing and writing of information is executed, first a seek control or a track jump control is made to ensure that an optical head is tracked onto the proper track 31.

At a seek control or a track jump control, the control part 100 turns on WSW$_1$ 505 by turning on servo switching signal WL, turns off WSW$_2$ 506 by turning off servo switching signal WS and turns off WSW$_3$ 512 by turning off servo switching signal PS, for the first track servo control part 50.

Meanwhile, for the second track servo control part 60, the control part 100 turns on ESW$_1$ 605 by turning on servo switching signal EL, turns off ESW$_2$ 606 by turning off servo switching signal ES and turns on ESW$_3$ 610 by turning on servo switching signal EE The control part 100 turns off write mode signal WRM that is applied to the memory control part 72 and supplies it to the adder 609 by having the bias information about each track 31 be read from the wave form memory 71.

By this operation, in the first track servo control part 50, a servo loop is formed according to first track position signal WTPS comprising the first lens actuator 312, the first position signal generating circuit 501, the phase compensation circuit 503, WSW$_1$ 505, the adder 507, the power amplifier 508, and the first lens actuator 12. This servo loop locks the first lens actuator 12 which causes a track servo control to be voided by first track error signal WTES and thereby enables a proper seek control or a proper track jump control Meanwhile, in the second track servo control part 60, a track servo control is made with a servo loop comprising the second lens actuator 22, the second position signal generating circuit 601, the adder 609, the phase compensation circuit 603, ESW$_1$ 605, the adder 607, the power amplifier 608, and the second lens actuator 22 according to the second track position signal ETPS.

In this case, since both $ESW_1$ 605 and $ESW_3$ 610 are on, the bias information stored in the bias information memory part 70 and read from the wave form memory 71 is added to second track position signal ETPS at the adder 609.

Consequently, since the second lens actuator 22 is locked at a position adjusted by an amount of bias information supplied from the bias information memory part 70, when a proper seek control or a proper track jump control is finished and the first light beam 112 of first optical head 10 properly tracks on the proper track 31, the second light beam 212 projected by the second optical head 20 properly tracks on the same track 31; and when the control part 100 turns off $ESW_1$ 605 by turning off EL and turns on $ESW_2$ 606 by turning on ES, a track servo control according to second track error signal ETES is resumed.

A seek control or a track jump control is made similarly with the prior art. Namely, when a seek control or a track jump control is made, a track number for a seek control or a track jump control is indicated from an upper rank device not shown to the control part 100.

By a preset remaining track number and a corresponding table (not shown) of aimed speed, the control part 100 calculates the accelerating current signal necessary for a seek control or a track jump control of an indicated track number outputs it to the D/A converter 513.

The power amplifier 515 generates a VCM driving signal VCDV in proportion to the accelerating current signal ACI D/A converted by the D/A converter 513 and supplies it to the VCM 41. In turn, the VCM 41 performs an accelerating control of the positioner 40 based on the first optical head 10.

Each time the first optical head 10 crosses over the track 31, one piece of first track error signal WTES is generated and the comparator 509 generates a piece of zero cross signal TZC according to a generation of the first track error signal WTES.

The TCNT 510 counts the number of this zero cross signal TZC generated and outputs the counted value to the control part 100.

The control part 100 samples the counted value output from the TCNT 510 by a certain sampling interval, and determines the speed difference between the target speed and the actual speed of the first optical head 10 calculated by the sampling interval and the counted value. Then the control part 100 generates an accelerating or decelerating current signal and sends it to the D/A converter 513

By repeating the above actions, respective light beams 112 and 212 of the first optical head 10 and the second optical head 20 are tracked on the proper track 31.

When the track 31 is properly tracked on, the positioner 40, which includes the first optical head 10 halts and the comparator 509 stops generating zero cross signal TZC. By not detecting zero cross signal TZC over a certain period of time, the control part 100 detects that the positioner 40, which includes the first optical head 10, tracks on the proper piece of the track 31.

Because the seek control or track jump control actions explained above are the same as existing seek control or track jump control actions, their detailed explanation is omitted.

(3) Step $S_3$

As explained above, when a seek control or a track jump control is finished and respective light beams 112 and 212 of the first optical head 10 and the second optical head 20 correctly track on the proper piece of the track 31, the control part 100 begins a track servo control of the first optical head 10 and the second optical head 20.

That is, the control part 100 turns off $WSW_1$ 505 by turning off servo switching signal WL, turns on $WSW_2$ 506 by turning on the servo switching signal WS and turns on $WSW_3$ 512 by turning on servo switching signal PS for the first track servo control part 50.

Meanwhile, for the second track servo control part 60, control part 100 turns off $ESW_1$ 605 by turning off servo switching signal EL, turns on $ESW_2$ 606 by turning on servo switching signal ES and turns off $ESW_3$ 610 by turning off servo switching signal EE.

By this operation, in the first track servo control part 50, a track servo control is made with double servo loops of a servo loop according to first track error signal WTES comprising the first optical system 11, the first servo signal generating circuit 502, the phase compensation circuit 504, $WSW_2$ 506, the adder 507, the power amplifier 508, the first lens actuator 12 and a servo loop according to first track position signal WTPS comprising the first lens actuator 12, the first position signal generating circuit 501, the phase compensation circuit 511, $WSW_3$ 512, the adder 514, the power amplifier 515, the positioner 40 (VCM 41), which has first light beam 112 projected by the first optical head 10 controlled to correctly track on the center of the proper track 31.

Meanwhile, in the second track servo control part 60, a track servo control is made with a servo loop comprising the second optical system 21, the second servo signal generating circuit 602, the phase compensation circuit 604, $ESW_2$ 606, the adder 607, the power amplifier 608, and the second lens actuator 22 according to second track error signal ETES.

Consequently, the first light beam 212 projected by the second optical head 20 is controlled to correctly track on the center of the proper track 31. In this case, since $ESW_1$ 605 is off (It does not matter whether $ESW_3$ 610 is on or off.), the bias information stored in bias information memory part 70 does not interfere with the track servo control of the second optical head 20.

As described above, after the first optical head 10 and the second optical head 20 correctly track on the proper pieces of track 31, ordinary erasing/writing or reading of information is made to optical disk 30.

Thus far, a preferred embodiment of this invention has been explained, which should not be construed to preclude any modification. This invention is not limited to this particular embodiment, but can be applied in various forms pursuant to the object of this invention. For instance, instead of being based on the first optical head 10, a seek control or a track jump control based on the second optical head 20 can be executed, in which case bias information can be derived from the dislocation of the first lens actuator 12 of the first optical head 10.

Still more, since said bias information (bias wave form) is in the form of a sine wave, the bias information of one rotation of an optical disk need not be memorized. Instead, only the bias information of half a rotation need be memorized, and its inverted bias information can be used as the bias information for the other half.

As explained so far, since this invention is configured such that dislocation of the lens actuator of a non-reference optical head on an optical disk (caused, for example, by an optical head assembling error and optical disk eccentricity) is memorized as bias information and that a track movement control of the non-reference optical head is made by a control signal adjusted by the bias information at the time of a seek control or a track jump control, when a seek control or a track jump control is made, the light beam of the non-reference optical head can be correctly tracked on the proper track. Therefore, even if a seek control or a track jump control is made based on the reference optical head, the non-reference optical head can be controlled so that its seek control or track jump control is executed precisely without being affected by an assembling error of the optical head or optical disk eccentricity.

What is claimed is:

1. An optical disk apparatus having a first optical head equipped with a first lens actuator for movement control of a first light beam projected to a location on a track of an optical disk and a second optical head equipped with a second lens actuator for controlling the movement of a second light beam projected to another location of an optical disk different form the location projected to by said first light beam, comprising:
    a first track servo control part means for performing control so that the first light beam is projected to a track and for generating a control signal;
    a second track servo control part means for performing control so that the second light beam is projected to a track;
    a positioner means for controlling the movement of the first and second optical heads in response to the control signal;
    a bias information memory part means for storing bias information including information pertaining to a position of the second optical head relative to said first optical head obtained when said first and second track servo control part means control the light beams of both said first and second optical heads to properly track on the same track; and
    means for enabling said second track servo control part means to control the position of the second optical head according to the bias information stored in said bias information memory part means when the first light beam is projected on a target track.

2. The optical disk apparatus according to claim 1, wherein the bias information includes information pertaining to tracks of the optical disk, and
    wherein said second track servo control part controls the position of the second optical head according to the bias information corresponding to the target track when the first light beam is projected on the target track.

3. The optical disk apparatus according to claim 1, wherein the bias information includes information pertaining to any track within each block of the optical disk, when all the tracks of the optical disk are divided into more than one block, and
    wherein said second track servo control part controls the position of the second optical head according to the bias information of the block to which the target track belongs wherein the first light beam is projected on the target track.

4. The optical disk apparatus according to claim 1, wherein the bias information includes information pertaining to any track within any block of an optical disk, when all tracks of the optical disk are divided into two parts, and
    wherein said second track servo control part controls the position of the second optical head according to the bias information corresponding to the block to which the target track belongs when the first light beam is provided on the target track.

5. The optical disk apparatus according to claim 1, wherein the bias information includes information pertaining to each track of the optical disk and information pertaining to half a rotation of each said track.

6. The optical disk apparatus according to claim 1, wherein the bias information includes information pertaining to the location of the second lens actuator on the second optical head when the first light beam of the first optical head correctly tracks on a center of the target track.

7. The optical disk apparatus according to claim 1, wherein the bias information is stored in said bias information memory part means after one of power to the optical disk apparatus is turned on and an optical disk is exchanged.

8. The optical disk apparatus according to claim 1, wherein said optical disk apparatus further comprises means for controlling the first light beam and the second light beam to track on the same track by controlling the first light beam projected by the first optical head by said first track servo control part to correctly track on the center of a proper track, by performing a seek control or a track jump control, and by controlling the first light beam of the first optical head and the second light beam of the second optical head to track on the same track.

9. The optical disk apparatus according to claim 1, wherein said second lens actuator comprises a position sensor that detects a sense signal that corresponds to the amount of dislocation of the projected position of the second light beam from a track lead-in starting point along a track, and
    wherein said bias information memory part means obtains the predetermined bias information from the sense signal detected by said position sensor.

10. The optical disk apparatus according to claim 9, wherein said position sensor comprises a light emitting part and a light receiving device positioned on opposite sides of a fixed slit so that the light emitting part faces the light receiving device.

11. The optical disk apparatus according to claim 9, wherein
    said light receiving device comprises a two division light receiving device whose light receiving part is divided into two.

12. The optical disk apparatus according to claim 9, wherein
    said light receiving device comprises a four division light receiving device whose light receiving part is divided into four.

13. The optical disk apparatus according to claim 10, wherein
    said light receiving device comprises a photo diode.

14. The optical disk apparatus according to claim 1, wherein the bias information corresponds to at least one track of the optical disk.

* * * * *